US010814818B2

(12) United States Patent
Dry et al.

(10) Patent No.: US 10,814,818 B2
(45) Date of Patent: *Oct. 27, 2020

(54) VEHICLE SEATING ASSEMBLY WITH AIRBAG CARRIER

(71) Applicant: Ford Global Technologies, LLC, Dearborn, MI (US)

(72) Inventors: Alan George Dry, Grosse Pointe Woods, MI (US); Johnathan Andrew Line, Northville, MI (US); Brian Robert Spahn, Plymouth, MI (US); Benjamin Yilma, Canton, MI (US); S. M. Akbar Berry, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 184 days.

This patent is subject to a terminal disclaimer.

(21) Appl. No.: 15/792,854

(22) Filed: Oct. 25, 2017

(65) Prior Publication Data

US 2019/0118755 A1    Apr. 25, 2019

(51) Int. Cl.
| | | |
|---|---|---|
| *B60R 21/207* | (2006.01) | |
| *B60R 21/217* | (2011.01) | |
| *B60N 2/14* | (2006.01) | |
| *B60N 2/75* | (2018.01) | |

(52) U.S. Cl.
CPC .............. *B60R 21/207* (2013.01); *B60N 2/14* (2013.01); *B60N 2/777* (2018.02); *B60N 2/79* (2018.02); *B60R 21/217* (2013.01); *B60R 2021/2173* (2013.01)

(58) Field of Classification Search
CPC .......... B60R 2021/2173; B60R 21/207; B60R 21/217; B60N 2/777; B60N 2/79; B60N 2/757
See application file for complete search history.

(56) References Cited

U.S. PATENT DOCUMENTS

| | | | | |
|---|---|---|---|---|
| 2,873,122 A | * | 2/1959 | Peras ...................... | B60R 21/02 180/271 |
| 3,173,722 A | * | 3/1965 | Carbonetti ............... | B60N 2/99 297/423.17 |
| 3,420,572 A | * | 1/1969 | Bisland ................... | B60N 2/002 180/271 |
| 3,623,768 A | * | 11/1971 | Capener ................. | B60R 21/207 297/330 |
| 3,901,550 A | * | 8/1975 | Hamy ..................... | B60R 21/02 297/486 |
| 3,981,520 A | * | 9/1976 | Pulling ................. | B60N 2/4221 280/730.2 |
| 4,508,294 A | | 4/1985 | Lorch | |
| 4,906,047 A | * | 3/1990 | Mikami ............... | B60N 2/4221 297/464 |

(Continued)

FOREIGN PATENT DOCUMENTS

DE           19937028 A1 *  7/2000  ............. B60R 21/20

*Primary Examiner* — Timothy Wilhelm
(74) *Attorney, Agent, or Firm* — David Coppiellie; Price Heneveld LLP (57) ABSTRACT

A method for operating an airbag carrier is provided herein. The method includes the steps of moving carrier containing an airbag along a guide-channel of a seating assembly from a stowed position to a use position, and deploying the airbag into an occupant space of the seating assembly.

10 Claims, 9 Drawing Sheets

(56) References Cited

U.S. PATENT DOCUMENTS

| | | | | |
|---|---|---|---|---|
| 5,375,908 A * | 12/1994 | Goor | ........................ | B60R 21/01 297/216.11 |
| 5,492,361 A * | 2/1996 | Kim | ........................ | B60R 21/02 280/730.1 |
| 5,505,487 A * | 4/1996 | Brown | .................... | B60R 21/207 280/730.1 |
| 5,511,850 A * | 4/1996 | Coursey | ................ | B60N 2/2839 280/730.1 |
| 5,524,960 A * | 6/1996 | Townsend | .................. | B60J 5/06 296/155 |
| 5,531,470 A | 7/1996 | Townsend | | |
| 5,564,736 A * | 10/1996 | Kim | ........................ | B60R 21/02 280/730.2 |
| 5,730,458 A * | 3/1998 | Byon | ...................... | B60R 19/00 280/730.2 |
| 5,746,443 A * | 5/1998 | Townsend | ............... | B60R 21/20 280/730.2 |
| 5,938,237 A * | 8/1999 | Abels | .................... | B60J 5/0487 280/753 |
| 6,030,036 A * | 2/2000 | Fohl | ...................... | B60R 21/207 297/216.14 |
| 6,234,525 B1 * | 5/2001 | Schroder | .................. | B60R 21/02 280/748 |
| 6,315,245 B1 * | 11/2001 | Ruff | ........................ | B64D 25/02 244/122 AG |
| 7,726,733 B2 * | 6/2010 | Balser | .................. | B60N 2/4235 280/730.2 |
| 8,430,192 B2 * | 4/2013 | Gillett | ...................... | B60K 1/04 180/65.51 |
| 8,820,830 B2 * | 9/2014 | Lich | ...................... | B60N 2/0276 297/216.13 |
| 8,985,622 B1 * | 3/2015 | Cannon | .................. | B60R 21/231 280/730.2 |
| 9,783,155 B2 * | 10/2017 | Kondo | ...................... | B60N 2/79 |
| 10,272,865 B2 * | 4/2019 | Nagasawa | ................ | B60R 21/18 |
| 2003/0030253 A1 * | 2/2003 | Galmiche | ............. | B60R 21/205 280/728.2 |
| 2013/0093221 A1 * | 4/2013 | Ligonniere | ............ | B64D 11/06 297/173 |
| 2018/0281724 A1 * | 10/2018 | Nagasawa | ................ | B60R 21/055 |
| 2018/0281725 A1 * | 10/2018 | Nagasawa | ................ | B60R 21/18 |
| 2019/0092264 A1 * | 3/2019 | Spahn | ................... | B60R 21/207 |
| 2019/0106077 A1 * | 4/2019 | Dry | ........................ | B60N 2/753 |
| 2019/0111877 A1 * | 4/2019 | Line | ........................ | B60N 2/42 |
| 2019/0118754 A1 * | 4/2019 | Dry | ........................ | B60N 2/777 |

\* cited by examiner

VEHICLE SEATING ASSEMBLY WITH AIRBAG CARRIER

FIELD OF THE INVENTION

The present disclosure generally relates to vehicles and, more particularly, to vehicle seating assemblies.

BACKGROUND OF THE INVENTION

Autonomous vehicles create a new expectation of occupant freedom of movement within a vehicle. This may challenge conventional wisdom for fixed airbag placement and use of traditional seatbelts.

SUMMARY OF THE INVENTION

According to one aspect of the present disclosure, a method of operating an airbag carrier includes the steps of moving a carrier containing an airbag along a guide-channel of a seating assembly from a stowed position to a use position, and deploying the airbag into an occupant space of the seating assembly.

According to another aspect of the present disclosure, a method of operating an airbag carrier includes the steps of moving an airbag containing carrier that is coupled to a seating assembly from a stowed position to a use position, opening a release portion of the carrier to form a gap, deploying the airbag through the gap, and bracing the airbag with a reactive surface defined by the opened release portion.

According to yet another aspect of the present disclosure, a method of operating an airbag carrier includes the steps of, receiving at least one of an occupant presence signal, a carrier position signal, and a threat prediction signal, and moving a carrier containing an airbag along a guide-channel coupled to a seating assembly.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In reference to FIGS. 1-9, a vehicle 10 has a seating assembly 14. The seating assembly 14 includes a seat-base 18 and a seatback 22 coupled to the seat-base 18. An armrest 26 is coupled to the seatback 22 and/or the seat-base 18. A guide-channel 30 is coupled to at least one of the seatback 22 and the seat-base 18. A carrier 34 that includes an airbag 38 is slidably coupled to the guide-channel 30. The carrier 34 is operable between a stowed position, disposed vehicle downward of the armrest 26, and a use position, where an airbag deployment side 42 of the carrier 34 is generally directed seating assembly rearward.

Figure 1:
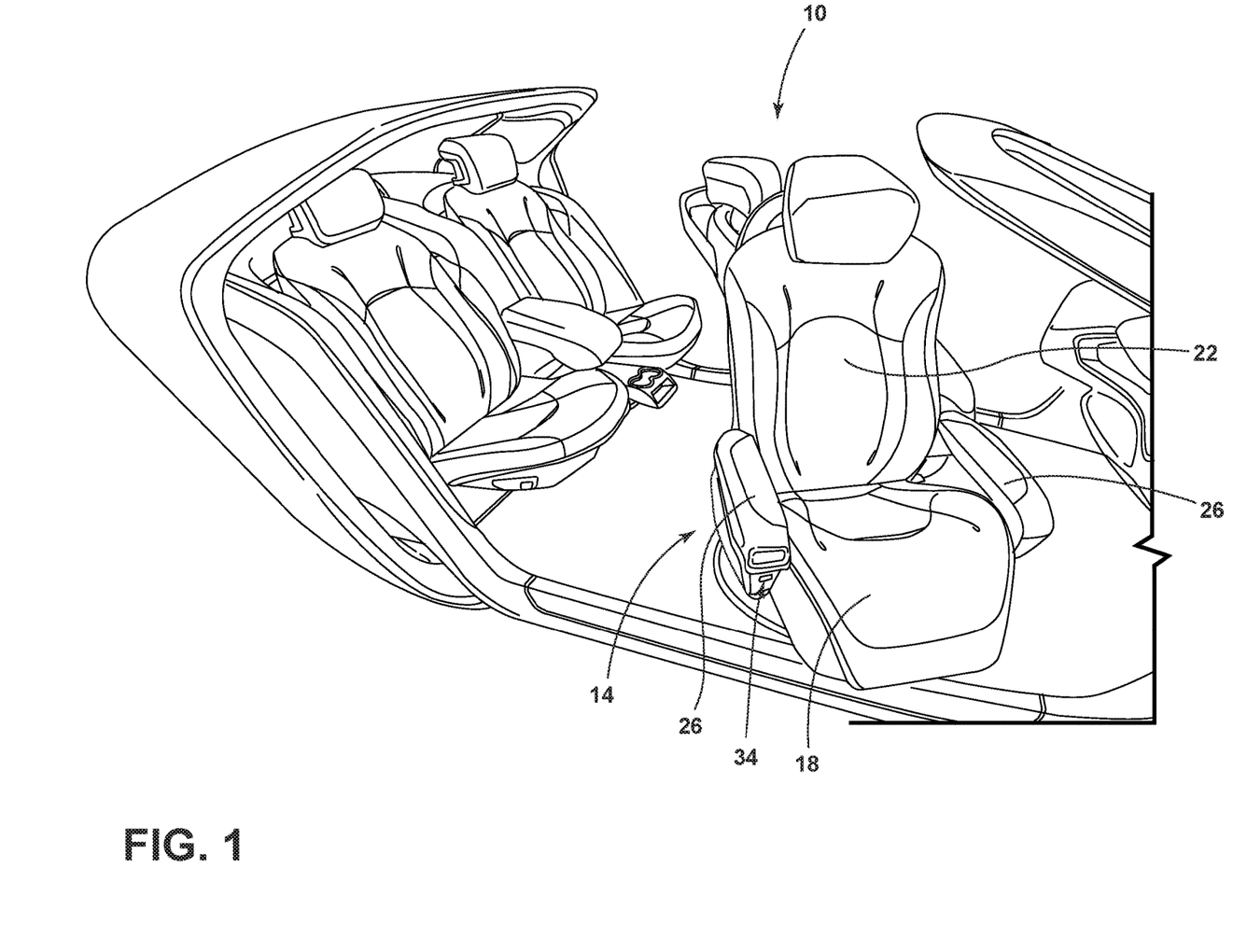
FIG. 1 is a perspective view of a vehicle interior equipped with a seating assembly having an airbag carrier, according to one embodiment.
Figure 2A:
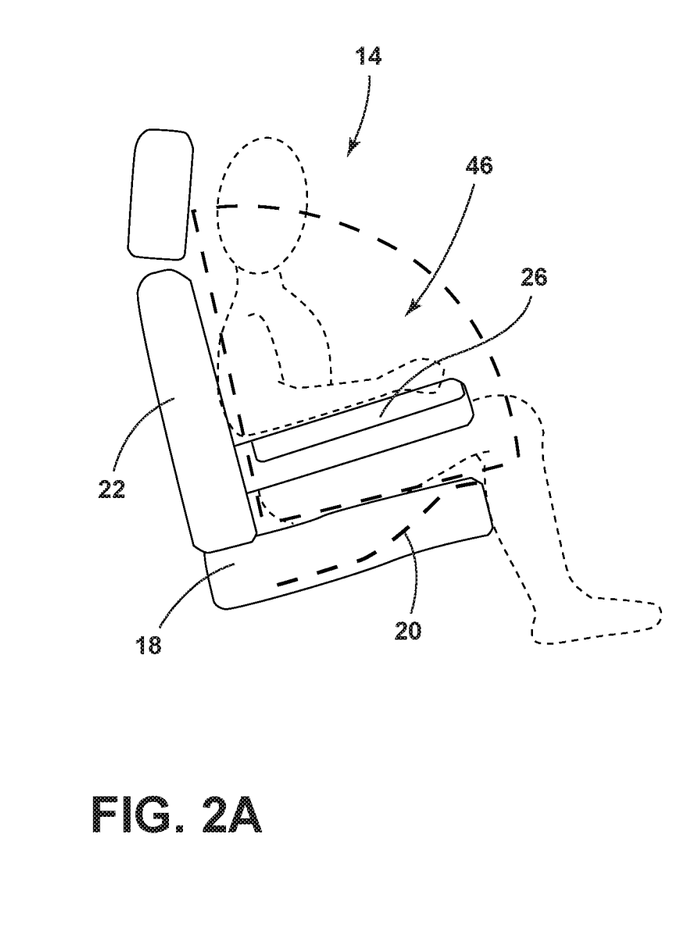
FIG. 2A is a side elevational view of the seating assembly illustrating an occupant space defined by the seating assembly, according to one embodiment.

Referring now to FIGS. 1 and 2A, the vehicle 10 includes the seating assembly 14. The seating assembly 14 may include the seatback 22 coupled to the seat-base 18. The seat-base 18 may include an anti-submarining ramp 20 configured to prevent an occupant from slipping under a safety restraint device, such as a seatbelt or the airbag 38, in the event of a crash or sudden stop of the vehicle. The armrest 26 may be coupled to the seatback 22 and/or seat-base 18.

The seating assembly 14 may be movable within the vehicle 10. For example, the seating assembly 14 may move in vehicle forward and rearward directions as is typical of vehicle seating assemblies. In some embodiments, the seating assembly 14 may move in various directions within the vehicle 10 and/or rotate or swivel relative to the vehicle 10 such that the seating assembly 14 may face various vehicular directions.

Figure 2B:
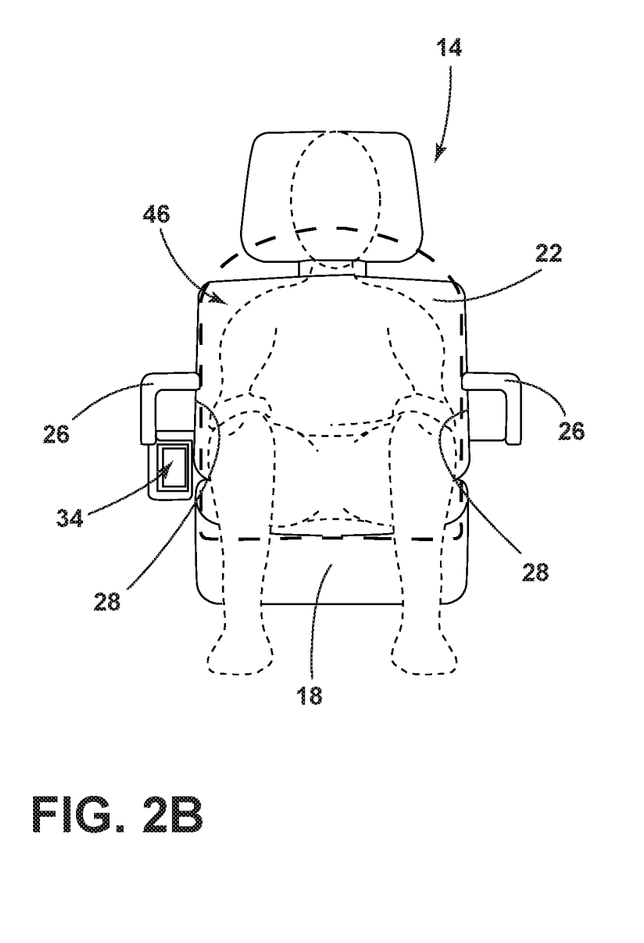
FIG. 2B is a front elevation view of the seating assembly illustrating an occupant space defined by the seating assembly, according to one embodiment.

Referring now to FIGS. 2A and 2B, the seat-base 18 and the seatback 22 may generally define an occupant space 46. In embodiments in which the seating assembly 14 includes armrests 26, the occupant space 46 is laterally delineated by the inner-sides 28 of the armrests 26, as shown in FIG. 2B.

Figure 3:
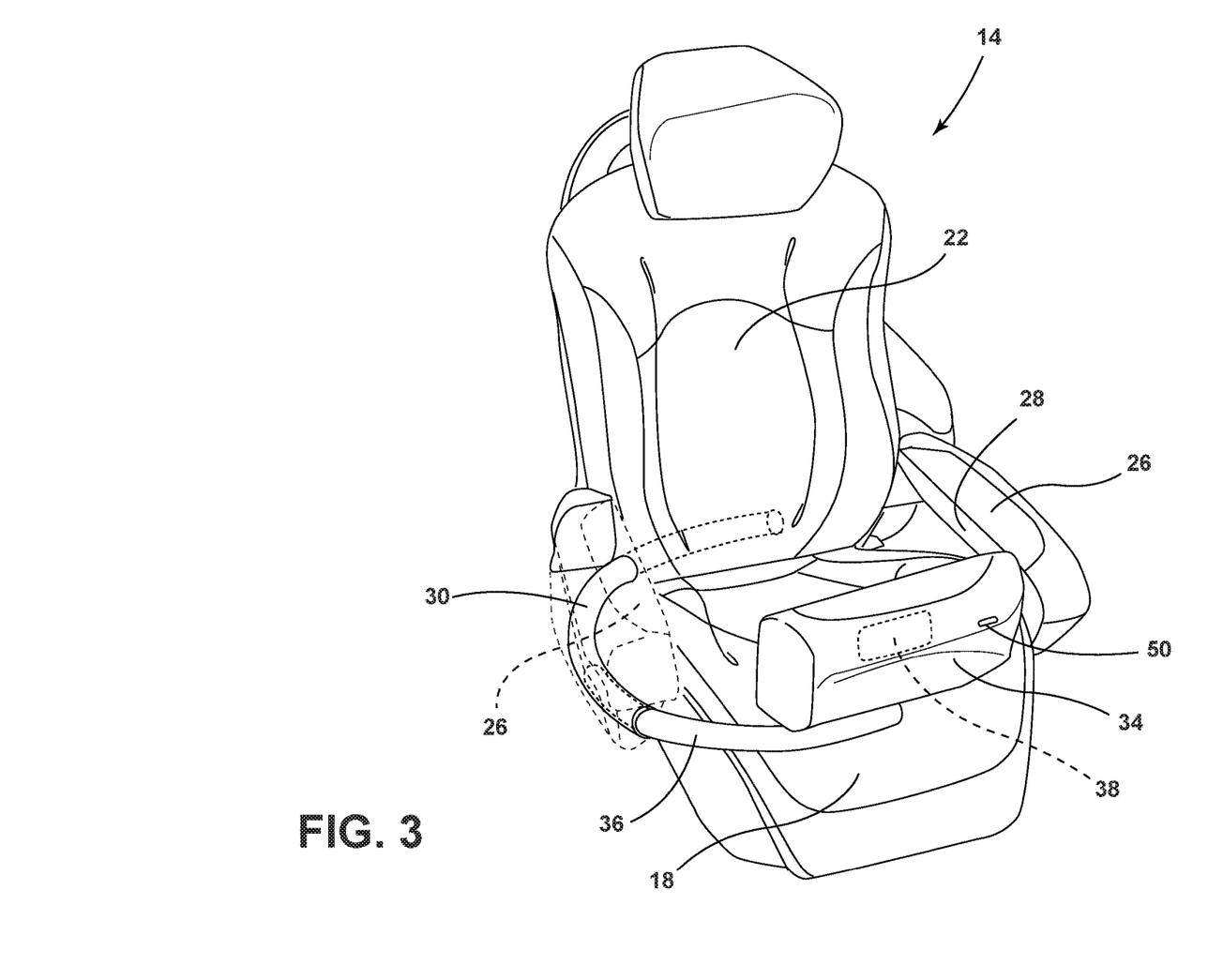
FIG. 3 is a side perspective view of the seating assembly, illustrating the airbag carrier operably coupled to a guide-channel coupled to the seating assembly, according to one embodiment.

In reference to FIG. 3, the guide-channel 30 may be coupled to the seating assembly 14. In various embodiments, the guide-channel 30 may be coupled to the seat-base 18, seatback 22, armrest 26, and/or a combination thereof. In some embodiments, the guide-channel 30 may be at least partially disposed within the seatback 22 and/or the seat-base 18. In some embodiments, the guide-channel 30 may be disposed between the armrest 26 and the seat-base 18. In some embodiments, the guide-channel 30 may be disposed beneath the armrest 26. In other words, the guide-channel 30 may be disposed vehicle downward of the armrest 26 and/or a portion of the armrest 26. The guide-channel 30 may be generally tubular in profile. In some embodiments, the guide-channel 30 may have a curved elongate portion. In some examples, the guide-channel 30 may be partially disposed within the seatback 22 and extend for a lateral extent therein and be partially disposed outside of the seatback 22 and extend forward therefrom for a generally longitudinal extent beneath the armrest 26.

Referring further to FIGS. 3, the seating assembly 14 may include the carrier 34. The carrier 34 may be movably coupled to the guide-channel 30. In some embodiments, the carrier 34 may be slidably coupled to the guide-channel 30. The carrier 34 may include a tail portion 36 that is configured to slidably engage with the guide-channel 30. In embodiments in which the guide-channel 30 is tubular in shape, the tail portion 36 may be engaged with the guide-channel 30 in such a way that at least part of the tail portion 36 is positionable within the tubular portion of the guide-channel 30. The tail portion 36 may be curved. As shown in FIG. 3, in some embodiments, the guide-channel 30 may have a key slot that corresponds with an attachment fin coupling the tail portion 36 to the carrier 34. In operation, the key slot receives the attachment fin to allow the tail portion 36 to slide into the guide-channel 30 without the carrier 34 impeding the movement.

Figure 4A:
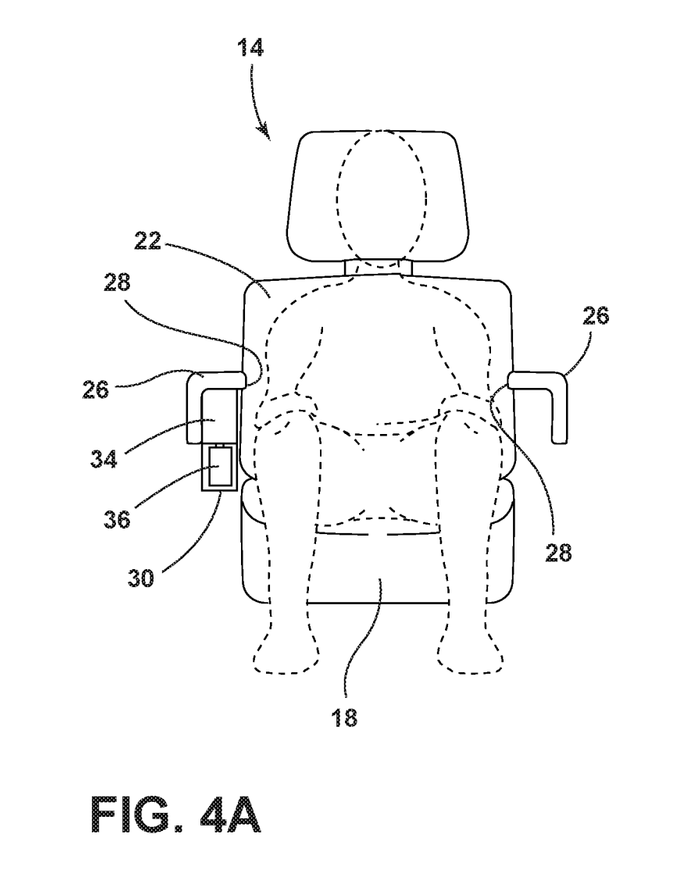
FIG. 4A is a front elevational view of the seating assembly, illustrating the carrier in the stowed position, according to one embodiment.

In reference to FIGS. 4A-5C, the carrier 34 may be operable between a stowed position and a use position. As shown in FIGS. 4A and 5A, in some embodiments, the carrier 34 may be disposed vehicle downward of the armrest 26 while in the stowed position. In some embodiments, the carrier 34 may be disposed within the lateral bounds of the armrest 26 while in the stowed position. In such an example, the carrier 34 may be generally hidden from view while in the stowed position when it is viewed from a top-down perspective.

Figure 4B:
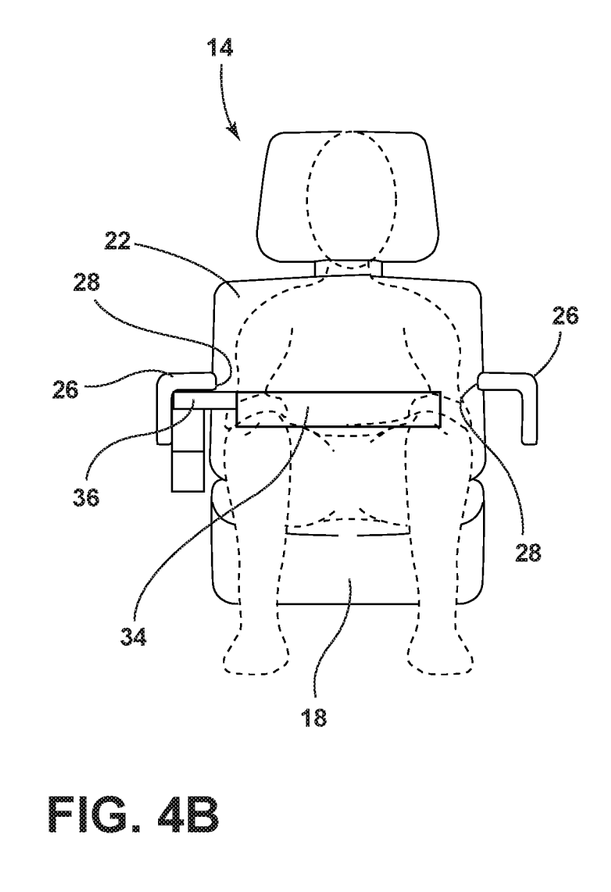
FIG. 4B is front elevational view of the seating assembly, illustrating the carrier in the use position, according to one embodiment.
Figure 5A:
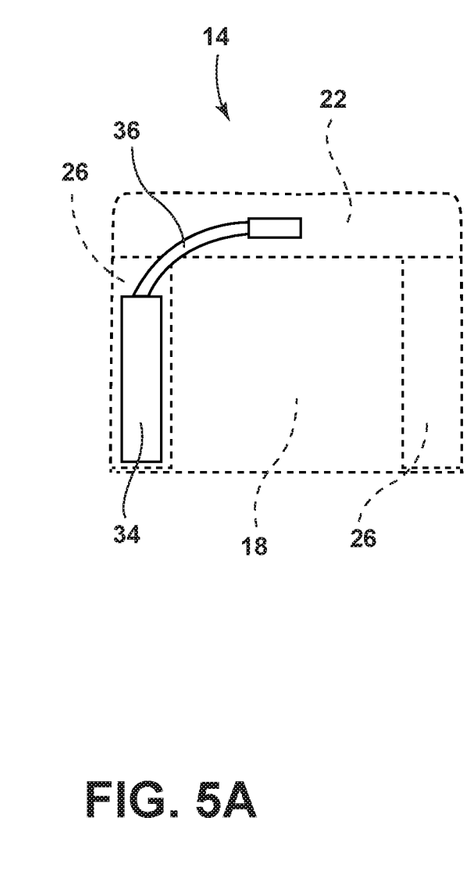
FIG. 5A is a top-down view of the seating assembly in phantom, illustrating the carrier in a stowed position, according to one embodiment.
Figure 5B:
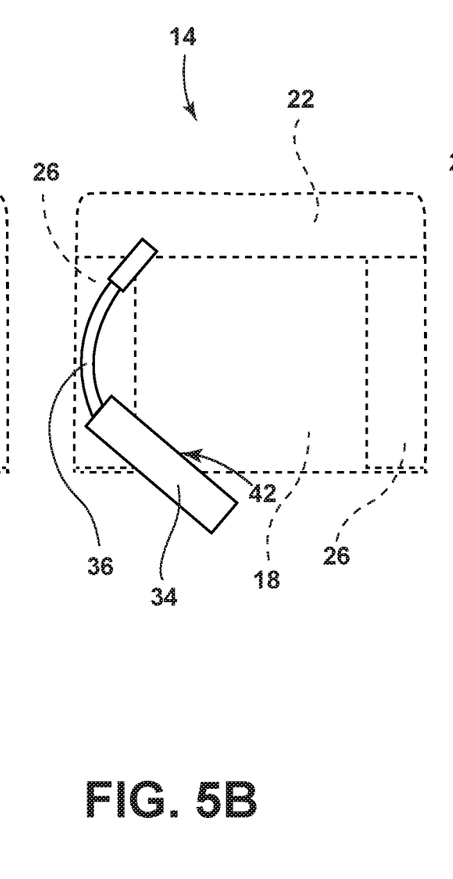
FIG. 5B is a top-down view of the seating assembly in phantom, illustrating the carrier between the stowed position and a use position, according to one embodiment.
Figure 5C:
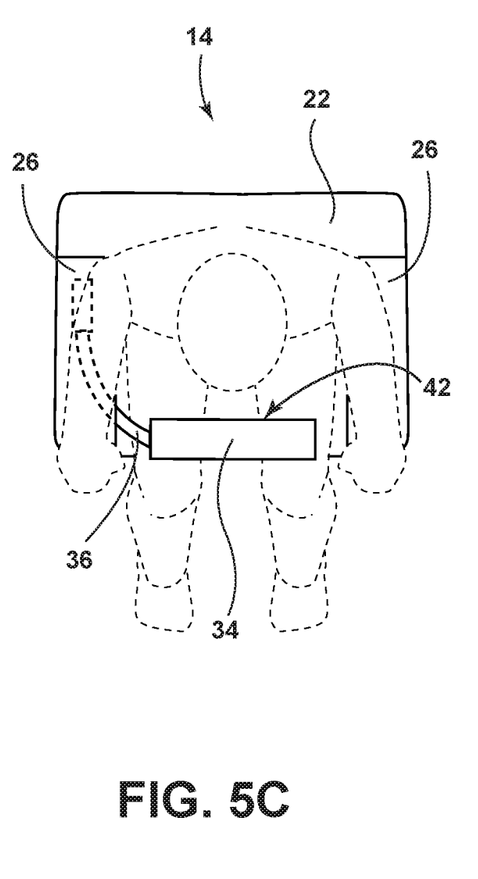
FIG. 5C is a top-down view of the seating assembly, illustrating the carrier in the use position, according to one embodiment.
Figure 6:
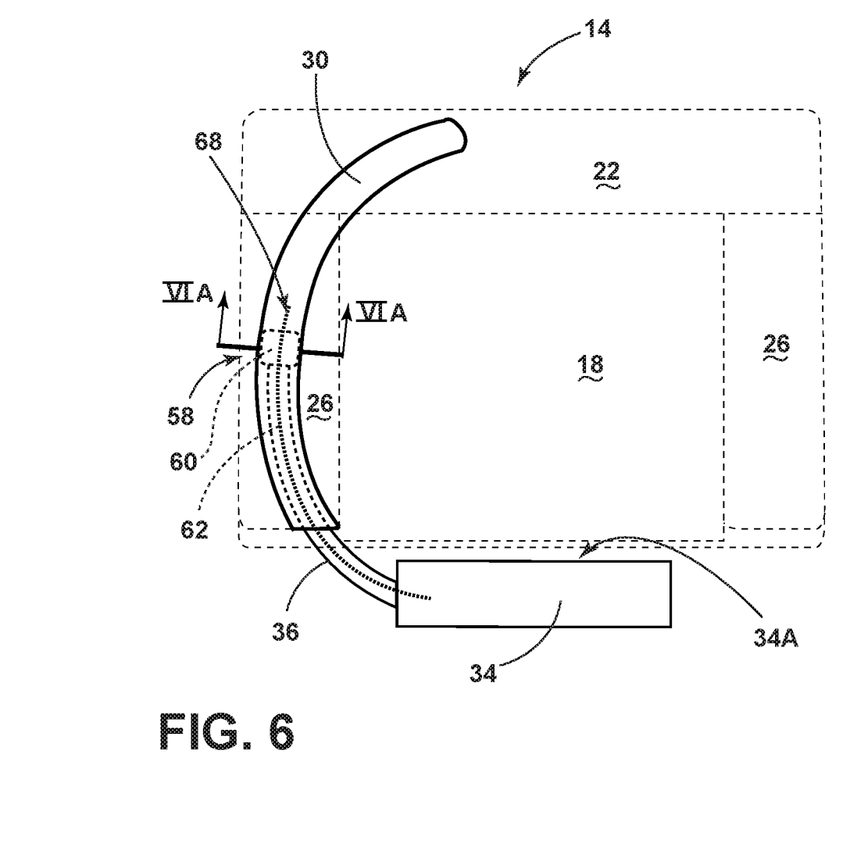
FIG. 6 is a top-down view of the seating assembly in phantom with the carrier in the use position, illustrating a propulsion system, propulsion feature, and a tail portion of the carrier in the guide-channel, according to one embodiment.

As shown in FIGS. 4B, 5C, and 6, in some embodiments, the carrier 34 may be within the occupant space 46, while in the use position. In some embodiments, the carrier 34 may turn about ninety degrees)(90° from the stowed position to the use position. For example, the carrier 34 may be about parallel to the armrest 26 in the stowed position and about perpendicular to the armrest 26 in the use position.

In various embodiments, the carrier 34 may move between the stowed position and the use position by sliding along the guide-channel 30. It is contemplated that in some embodiments the carrier 34 may move between the stowed position and the use position by utilizing motions other than, or in addition to, sliding. For example, the carrier 34 may move between the stowed position and the use position by pivoting, swiveling, rotating, extending, and/or performing a combination of those motions.

As shown in FIG. 5B, in various embodiments, the carrier 34 may be partially extendable to a position between the stowed and use position in addition to being fully extendable from the stowed position to the use position. In the partially extended position, the carrier 34 may serve as a resting surface for passenger objects, or provide other comforts to a seat occupant. In some embodiments, partial extension of the carrier 34 may enable occupants to utilize an electrical energy distribution point 50, which will be described in greater detail below.

Figure 6A:
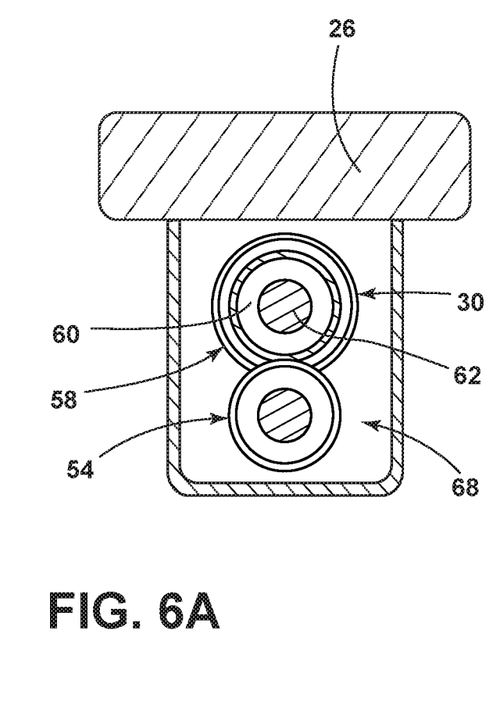
FIG. 6A is a cross-sectional view taken through line VIA-VIA of FIG. 6, illustrating the guide-channel, a propulsion feature, and the propulsion system beneath the armrest.

In reference to FIGS. 6 and 6A, a propulsion feature 54 configured to move the carrier 34 between the stowed position and the use position may be coupled to the seating assembly 14, the guide-channel 30, and/or the carrier 34. In some embodiments, the propulsion feature 54 may include an electric motor. In some embodiments, the propulsion feature 54 may include a pyrotechnic mechanism. It is contemplated that the propulsion feature 54 may be at least one of a variety of other devices configured to move the carrier 34 between the stowed position and the use position.

In further reference to FIGS. 6 and 6A, a propulsion system 58 configured to engage with the propulsion feature 54 may be coupled to the carrier 34. The propulsion system 58 may be coupled to/and/or engage with the tail portion 36 of the carrier 34. It is contemplated that in some embodiments the propulsion system 58 may include at least one of variety of devices to engage with the propulsion feature 54 (e.g., solenoid, piston assembly, etc.) In some embodiments, the propulsion system 58 may include a recirculating ball race nut 60. The recirculating ball race nut 60 may be coupled to the seating assembly 14 and/or the guide-channel 30. Further, the recirculating ball race nut 60 may be operably coupled to the propulsion feature 54. The recirculating ball race nut 60 may engage with a threaded driver screw 62. The threaded driver screw 62 may be curved. The threaded driver screw 62 may have a mechanically reversible thread. The threaded driver screw 62 may be coupled to the carrier 34. In some embodiments, the threaded driver screw 62 may be coupled to the tail portion 36 of the carrier 34.

In operation, the propulsion feature 54 may be configured to rotate the recirculating ball race nut 60; the recirculating ball race nut 60, in turn, drives the threaded driver screw 62, which subsequently moves the carrier 34. In an example in which the threaded driver screw 62 has a mechanically reversible thread, the carrier 34 may be moved back and forth depending on the direction of the recirculating ball race nut's 60 rotation. In other words, the carrier 34 may be moved from the stowed position to the use position as well as from the use position to the stowed position.

In some embodiments, the propulsion feature 54 may be controlled by an occupant. For example, the occupant may operate a switch that is configured to control the propulsion feature 54. In such an example, the occupant may engage the switch, which subsequently prompts the propulsion feature 54 to power extend and/or power retract the carrier 34. In some embodiments, the carrier 34 may be manually moved by the occupant. In this way, the carrier 34 may be moved by the occupant without engaging the propulsion feature 54.

Referring further to FIG. 6-6A, a locking feature 68 may be coupled to the carrier 34 and/or guide-channel 30. The locking feature 68 may be configured to substantially prevent movement of the carrier 34 along the guide-channel 30. The locking feature 68 may include at least one of a host mechanisms configured to prevent movement (e.g., pin, stop, dog, detent, abutment, etc.). In some embodiments, the locking feature 68 may include the propulsion feature 54 (e.g. electric motor). For example, an electric motor that is configured to move the carrier 34 may also lock the carrier 34 in place by continuous activation after the carrier 34 has fully extended to the use position. In some embodiments, the locking feature 68 may be manually engaged and/or disengaged by the occupant. For example, the locking feature 68 may be engaged and/or disengaged by operation of a switch. In some embodiments, the locking feature 68 is engaged by default, and the carrier 34 may be moved upon disengagement of the locking feature 68. In some embodiments, the locking feature 68 may be engaged and/or disengaged by a controller 70, which will be discussed in greater detail below.

In some embodiments, the locking feature 68 may be engaged and/or disengaged when the carrier 34 is in the stowed and/or use position. In some embodiments, the locking feature 68 may be engaged and/or disengaged when the carrier 34 is between the stowed position and the use position. In some embodiments, the locking feature 68 may be engaged when the carrier 34 is in and/or between the stowed and/or use positions.

Figure 7A:
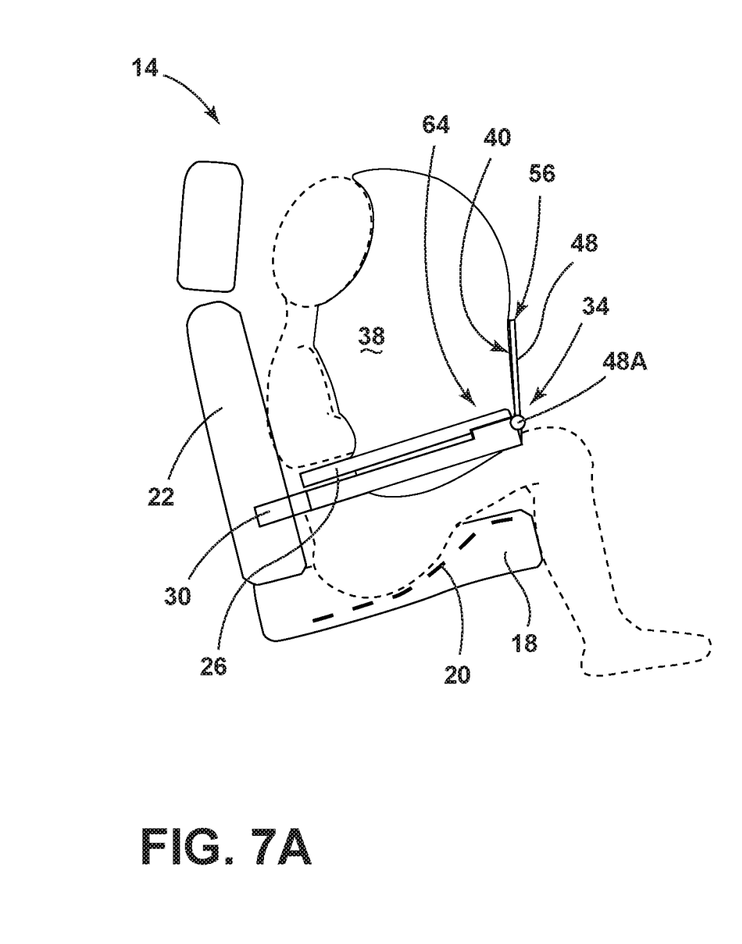
FIG. 7A is a side elevational view of the seating assembly, illustrating an airbag deployed from the carrier into the occupant space, according to one embodiment.
Figure 7B:
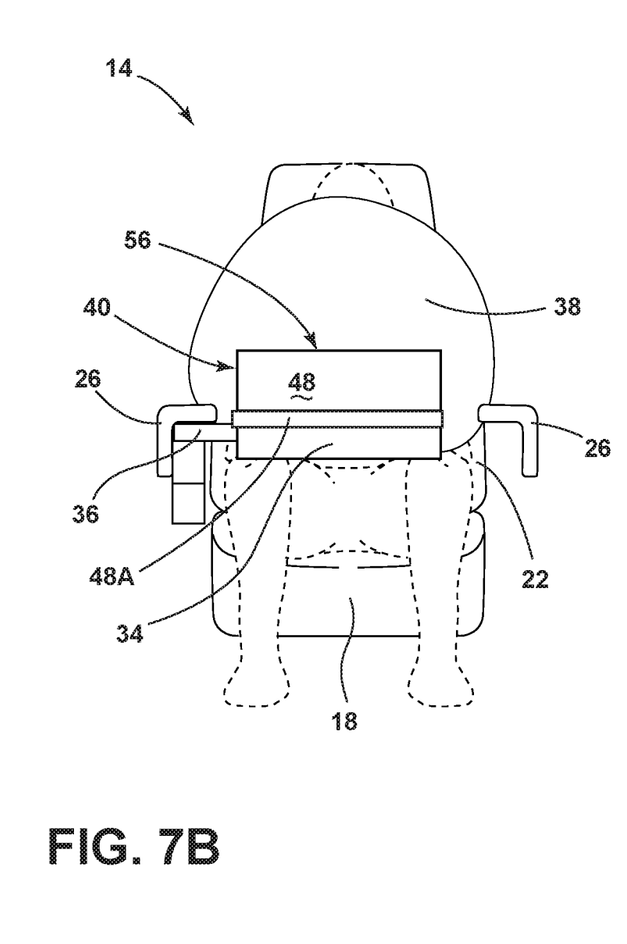
FIG. 7B is a front elevational view of the seating assembly, illustrating the airbag deployed from the carrier into the occupant space, according to one embodiment.

Referring now to FIGS. 3 and 7A-7B, the carrier 34 may include an airbag 38. The airbag 38 may be disposed within the carrier 34 and configured to deploy out of the carrier 34. In some embodiments, the airbag 38 may be configured to deploy into the occupant space 46 while the carrier 34 is in the use position. In some embodiments, the airbag 38 may be configured to deploy only when the carrier 34 is in the use position. The airbag 38 may be deployed by at least one of a host of mechanisms for deploying an airbag known to a person having ordinary skill in the art (e.g., pyrotechnic mechanism).

In various embodiments, the carrier 34 may include an airbag deployment side 42 out of which the airbag 38 may be configured to deploy. The airbag deployment side 42 may be on the inner-side 34A of the carrier 34, as shown in FIG. 6. In some embodiments, the airbag deployment side 42 of the carrier 34 is directed laterally inward relative to the seating assembly 14 while the carrier 34 is in the stowed position. In some embodiments, the airbag deployment side 42 of the carrier 34 may be directed seating assembly rearward while the carrier 34 is in the use position.

Referring now to FIGS. 7A-7B, the carrier 34 may include a release portion 56 that may yield and/or open when the airbag 38 deploys. In some embodiments, the release portion 56 may yield and/or open before and/or as the airbag 38 deploys. In some embodiments, the force of the airbag 38 deploying may cause the release portion 56 to yield and/or open. As shown in FIGS. 7A-7B, in some embodiments, the release portion 56 may be a panel 48 that is pivotally coupled to the carrier 34. The panel 48 may yield and/or open by pivoting about a pivot axis 48A before the airbag 38 deploys or by force of the airbag's 38 deployment. In some examples, the pivot axis 48A of the panel 48 may be generally directed in the same direction as the lengthwise direction of the armrest 26 while the carrier 34 is in the stowed position. In some examples, the pivot axis 48A of the panel 48 may be generally directed in a direction normal to the lengthwise direction of the armrest 26 while the carrier 34 is in the use position. In some embodiments, the release portion 56 may be a seam in the carrier 34 that is perforated and/or made of relatively weak material that yields and/or opens when the airbag 38 deploys. It is contemplated that in some embodiments the release portion 56 may include at least one of a variety of mechanisms fit for releasing the airbag 38. The opening and/or yielding of the release portion 56 may provide a gap 64 in the carrier 34. The airbag 38 may deploy out of the carrier 34 through the gap 64.

In various embodiments, the carrier 34 may include a reactive surface 40 configured to give directional support to the airbag 38 upon deployment of the airbag 38. In some embodiments, the reactive surface 40 may be the carrier 34. As shown in FIGS. 7A and 7B, in some embodiments, the reactive surface 40 may be defined by the opened release portion 56. In some examples, the reactive surface 40 may be the panel 48. The panel 48 may provide directional support for the airbag 38 by pivoting open before the airbag 38 deploys, or as a result of the airbag's 38 deployment, and then restraining the forward movement of the airbag 38. In some embodiments, the panel 48 may pivot open in the seating assembly-forward direction. It is contemplated that, in some embodiments, the panel 48 may pivot open in a variety of seating assembly directions.

As depicted in FIG. 3, and referenced above, the carrier 34 may include the electrical energy distribution point 50. The electrical energy distribution point 50 may be configured to charge a remote electronic device such as a cellular phone. In some embodiments, the electrical energy distribution point 50 may be configured to allow a transfer of data to and from a remote electronic device. The electrical energy distribution point 50 may be a standard car jack port, a USB port, a wireless charging surface, and/or any suitable mechanism known to a person having ordinary skill in the art for transferring electrical energy and/or data to and from remote electronic devices.

Figure 8:
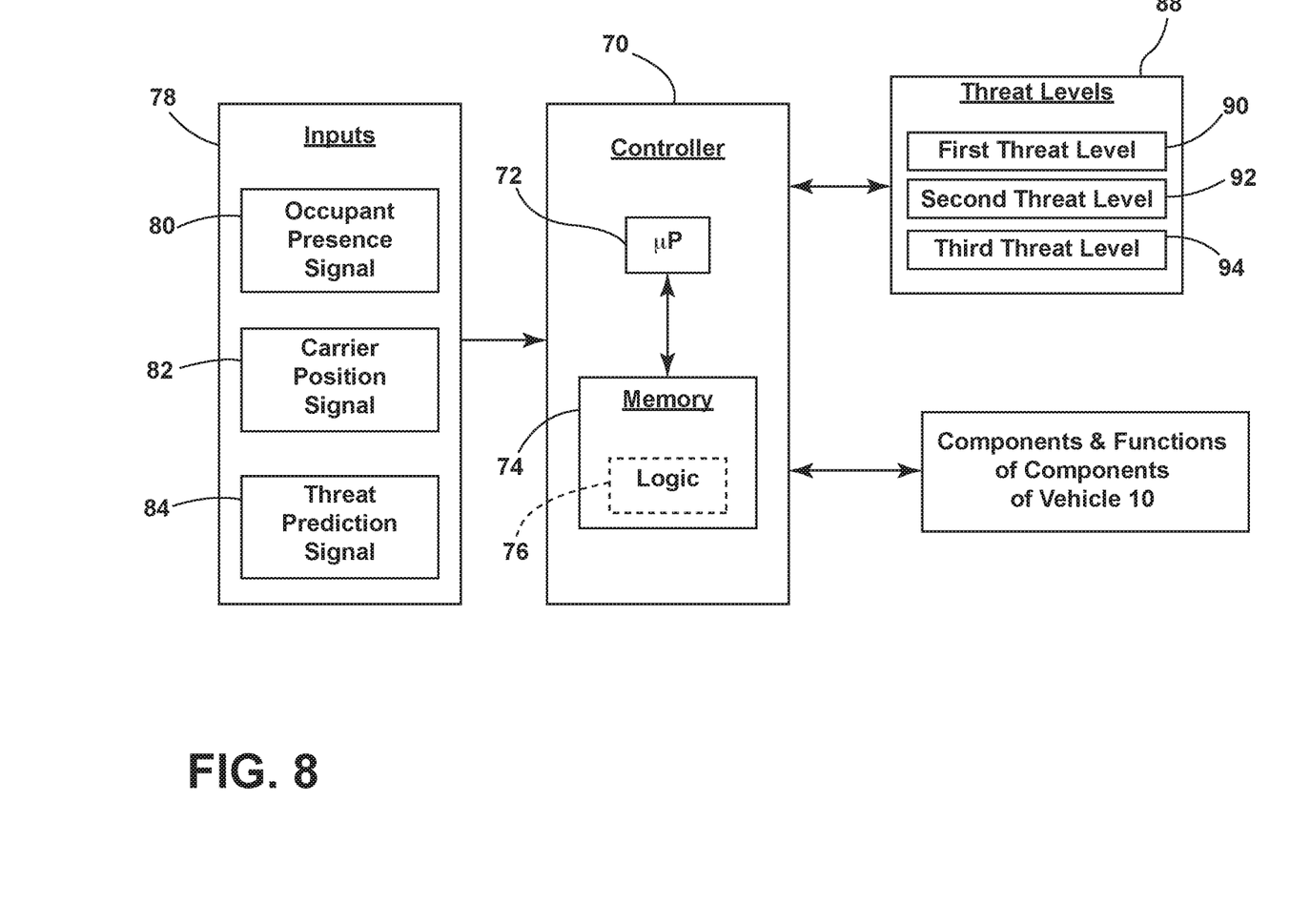
FIG. 8 is a block diagram illustrating how the controller interacts with the vehicle.

Referring now to FIG. 8, as referenced above, the seating assembly 14 is further illustrated having the controller 70 receiving various inputs 78 and controlling various outputs. The controller 70 may include a microprocessor 72 and memory 74 as illustrated, according to various embodiments. It should be appreciated that the controller 70 may include control circuitry such as analog and/or digital control circuitry. Stored within the memory 74 and executed by the microprocessor 72 is logic 76 for processing the various inputs 78 and controlling various outputs described herein. The inputs 78 to the controller 70 may include an occupant presence signal 80, which may be made available by one or more occupant sensors or from another controller, and may indicate the presence or absence of an occupant in the seating assembly 14. The presence or absence of an occupant in the seating assembly 14 may be determined through a variety of methods and/or by a variety of features (e.g., weight sensor, proximity sensor, etc). Additionally, the controller 70 may receive a carrier position signal 82 as the input 78. The carrier position signal 82 may be made available from another controller, and may indicate the position of the carrier 34. For example, the carrier position signal 82 may indicate that the carrier 34 is in the stowed position, the use position, or a position between the stowed and use positions. Further, the controller 70 may receive a threat prediction signal 84 as the input 78.

The threat prediction signal 84 may indicate a variety of conditions. In some embodiments, the threat prediction signal 84 indicates a likelihood of impact. In other words, the threat prediction signal 84 may indicate the likelihood of the vehicle 10 colliding with an object outside of the vehicle 10. The likelihood of impact may be determined by accounting for at least one of a host of factors which may include, but is not limited to, speed of the vehicle 10, proximity of the vehicle 10 to an object, size and/or shape of an object, proximity of the vehicle 10 to an object, direction of movement of the vehicle 10 relative to an object, direction of movement of an object relative to the vehicle 10, and/or speed of movement of an object. The likelihood of impact factors may be determined by a variety of devices that may include, but are not limited to, cameras, proximity sensors, and/or radar sensors. It is contemplated that a variety of other features may be employed for determining the factors of a likelihood of impact.

Referring further to FIG. 8, the controller 70 may classify the threat prediction signal 84 into at least one of a plurality of threat levels 88. In some embodiments, the threat prediction signal 84 may be classified as at least one of a first threat level 90, a second threat level 92, and a third threat level 94. In examples where the threat prediction signal 84 indicates a likelihood of impact, the first threat level 90 may indicate a lower likelihood of impact than the second threat level 92 and the third threat level 94. The second threat level 92 may indicate a higher likelihood of impact than the first threat level 90 and a lower likelihood of impact than the third threat level 94. The third threat level 94 may indicate a higher likelihood of impact than the first threat level 90 and the second threat level 92.

In some embodiments, the inputs 78 to the controller 70 may include various other signals such as signals from other controllers within the vehicle 10 and/or signals sent to the controller 70 by activation of switches by an occupant.

The controller 70 may also be connected, interact with, and/or control various other components of the vehicle 10 (e.g., the seating assembly 14, the propulsion feature 54, the airbag 38, the locking feature 68, etc.), and the functions of those components (e.g., movement, speed of movement, activation, engagement, deployment, etc.) directly, and/or through communication with another controller. For example, the controller 70 may facilitate the movement of the carrier 34 from the stowed position to the use position and the deployment of the airbag 38 from the carrier 34. In some examples, the controller 70 may facilitate such action by receiving the input 78 (e.g. threat prediction signal 84) and executing the logic 76 stored within the memory 74 with the microprocessor 72.

Figure 9:
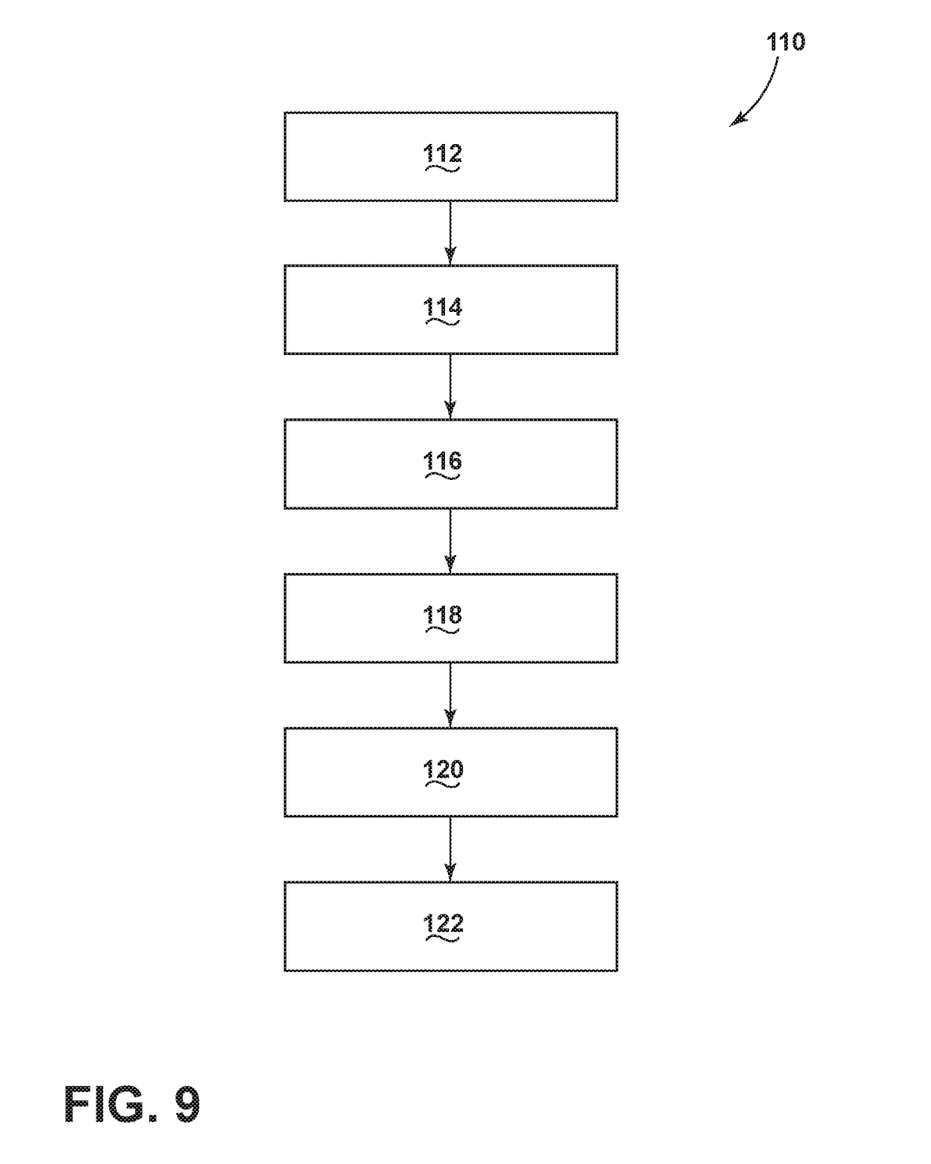
FIG. 9 is a flow chart of a method of operating an airbag carrier, according to one embodiment.

In reference to FIG. 9, a method of operating an airbag carrier 110 is disclosed. The method may include the step 112 of receiving at least one input 78. As discussed above, the controller 70 may receive inputs 78 from various sources. In various embodiments, the input 78 may include the occupant presence signal 80, the carrier position signal 82, the threat prediction signal 84, and/or various other signals. In some embodiments, upon receiving the threat prediction signal 84, the controller 70 may classify the threat prediction signal 84 into at least one of the plurality of threat levels 88 (e.g., the first threat level 90, the second threat level 92, the third threat level 94). The controller 70 may determine a change in threat levels 88. In some embodiments, the controller 70 may determine a change in threat levels 88 by utilizing the logic 76 within the memory 74 and/or the microprocessor 72.

Next, the method of operating an airbag carrier 110 may include the step 114 of moving the carrier 34. As discussed above, the carrier 34 may be moved between the stowed position and the use position. In various embodiments, the carrier 34 may move along the guide-channel 30. In some embodiments, the carrier 34 moves along the guide-channel 30 by sliding.

The carrier 34 may be moved by the propulsion feature 54 and/or the propulsion feature 54 working in tandem with the propulsion system 58. As previously discussed, the propulsion feature 54 may include a variety of devices for moving the carrier 34, such as an electric motor according to one embodiment, or a pyrotechnic mechanism according to another embodiment.

In various embodiments, the carrier 34 may be moved in response to the controller 70 receiving at least one input 78. In some embodiments, the carrier 34 may be moved from the stowed position to a position between the stowed position and the use position in response to an occupant presence signal 80. In some embodiments, the carrier 34 may be moved from the stowed position to the use position in response to the threat prediction signal 84, a classification of the threat prediction signal 84 into one of the threat levels 88, and/or a determination of a change in threat levels 88. For example, the carrier 34 may move from the stowed position to the use position in response to the controller 70 determining that the threat prediction signal 84 is reclassified from the first threat level 90 to the second threat level 92. In some examples, the carrier 34 may move toward the stowed position in response to a change in threat levels 88.

In some embodiments, the speed that the carrier 34 moves between the stowed position and the use position may be dependent on inputs 78 received by the controller 70. For example, in some embodiments, the speed of the movement of the carrier 34 in response to the threat prediction signal 84, threat level 88, and/or change in threat level 88 may be greater than the speed of movement of the carrier 34 in response to the occupant presence signal 80.

In some embodiments, the carrier 34 moving from the stowed position to the use position may expose the electrical energy distribution point 50 that is disposed on the carrier 34. In other words, the electrical energy distribution point 50 may be hidden from, inconveniently positioned from, less accessible to, and/or inaccessible to a seat occupant when the carrier 34 is in the stowed position. Accordingly, the electrical energy distribution point 50 may be revealed, more conveniently positioned for use, made more accessible, and/or made generally accessible to a seat occupant when the carrier 34 is in the use position.

In further reference to FIG. 9, the method of operating an airbag carrier 110 may include the step 116 of locking the carrier 34 via the locking feature 68. The carrier 34 may be locked in place in various positions between and including the stowed position and the use position. As discussed above the carrier may 34 be locked in place by the locking feature 68, which, in some embodiments, may include the propulsion feature 54 (e.g., electric motor).

In some embodiments, the carrier 34 may be locked in place via the locking feature 68 in response to the controller 70 receiving at least one input 78. In some embodiments, the carrier 34 may become locked in place by the locking feature 68 in response to the carrier position signal 82. For example, the carrier 34 may become locked in place in response to the carrier position signal 82 indicating that the carrier 34 is in the use position and/or the carrier position signal 82 indicating that the carrier 34 is in the stowed position. In some embodiments, the carrier 34 may become locked by the locking feature 68 in response to the threat prediction signal 84, a classification of the threat prediction signal 84 into at least one of the threat levels 88, and/or a determination of a change in threat levels 88. For example, carrier 34 may be locked in place relative to the guide-channel 30 by the locking feature 68 in response to the controller 70 determining that the threat prediction signal 84 is reclassified from the first threat level 90 to the second threat level 92. In some embodiments, the carrier 34 may cease to be locked in place by the locking feature 68 in response to the controller 70 receiving at least one input 78.

Next, the method of operating an airbag carrier 110 may include the step 118 of opening the release portion 56 of the carrier 34. As discussed above, the release portion 56 may open by yielding. For example, the release portion 56 may yield to the force generated by the airbag 38 deploying, and open as a result. In various embodiments, the release portion 56 may open to provide the gap 64 through which the airbag 38 may deploy. As discussed above, in some embodiments, the release portion 56 may be the panel 48 that is pivotally coupled to the carrier 34. The panel 48 may open by pivoting about the pivot axis 48A.

Next, the method of operating an airbag carrier 110 may include the step 120 of deploying the airbag 38. In various embodiments, the airbag 38 may be deployed through the gap 64. As discussed above, in various embodiments, the airbag 38 may be configured to deploy into the occupant space 46 while the carrier 34 is in the use position. In some embodiments, the airbag 38 may be configured to deploy in the seating assembly rearward direction while the carrier 34 is in the use position. In some embodiments, the airbag 38 may be configured to deploy only when the carrier 34 is in the use position.

In various embodiments, the airbag 38 may be configured to deploy in response to the controller 70 receiving at least one input 78. In some embodiments, the airbag 38 may be configured to deploy in response to the threat prediction signal 84, a classification of the threat prediction signal 84 into at least one of the threat levels 88, and/or a determination of a change in threat levels 88. For example, the airbag 38 may deploy in response to the controller 70 determining that the threat prediction signal 84 is reclassified from the second threat level 92 to the third threat level 94.

Next, the method of operating an airbag carrier 110 may include the step 122 of bracing the airbag 38 with the reactive surface 40. In some embodiments, the reactive surface 40 may be defined by the opened release portion 56. In some examples, the reactive surface 40 may be the panel 48. The panel 48 may brace the airbag 38, when and/or after the airbag 38 deploys, by pivoting open before the airbag 38 deploys, or as a result of the airbag's 38 deployment. The panel 48 may then restrain the seating assembly forward movement of the airbag 38. In other words, the release portion 56 may provide directional support for the airbag 38. Bracing the airbag 38 with the reactive surface 40 may benefit the occupant in the event of a crash by allowing the airbag 38 to be compressed against the reactive surface 40, effectively providing a relatively stable cushion for the occupant.

It is to be understood that unless specifically stated otherwise in the claims, that the steps of the method of operating an airbag carrier 110 need not be performed in the order that each step is listed above.

Use of the present disclosure may provide a variety of advantages. First, the airbag 38 within the carrier 34 may deploy to protect an occupant in the event of a crash. Second, the carrier 34 being coupled to the seating assembly 14, and having the airbag 38 that may deploy into the occupant space 46, may provide an occupant with an airbag system that consistently deploys into the occupant space 46, irrespective of the position of the seating assembly 14 within the vehicle 10. Third, the carrier 34 may provide a place for resting the arms or other items (e.g., book, phone, etc.) while in the use position or while between the use position and the stowed position.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method of operating an airbag carrier comprising the steps of:
    moving a carrier containing an airbag along a guide-channel of a seating assembly from a stowed position to a use position; and
    deploying the airbag in the seating assembly rearward direction into an occupant space of the seating assembly.

2. The method of claim 1, further comprising the step of:
    locking the carrier in the use position via a locking feature coupled to at least one of the carrier and the guide-channel.

3. The method of claim 2, wherein the locking feature comprises an electric motor.

4. The method of claim 1, further comprising the step of:
exposing an electrical energy distribution point disposed on the carrier.

5. The method of claim 1, wherein the step of moving the carrier containing the airbag further comprises the step of:
moving the carrier with a propulsion feature.

6. The method of claim 5, wherein the propulsion feature comprises an electric motor.

7. The method of claim 5, wherein the propulsion feature comprises a pyrotechnic mechanism.

8. A method of operating an airbag carrier comprising the steps of:
moving a carrier that contains an airbag and is coupled to a seating assembly from a stowed position to a use position along a guide-channel coupled to the seating assembly;
opening a release portion of the carrier to form a gap;
deploying the airbag through the gap in the seating assembly rearward direction; and
bracing the deployed airbag with a reactive surface defined by the opened release portion.

9. The method of claim 8, wherein the release portion comprises a panel pivotally coupled to the carrier.

10. The method of claim 9, further comprising the step of:
pivoting the panel to an open position.

\* \* \* \* \*